Inventor:
Robert W. Nordin
By Robert F. Michel, Atty.

United States Patent Office 3,200,407
Patented Aug. 10, 1965

3,200,407
SPEED SYNCHRONIZATION MECHANISM FOR SOUND MOTION PICTURE PROJECTOR
Robert W. Nordin, Skokie, Ill., assignor to Bell & Howell Company, Chicago, Ill., a corporation of Illinois
Filed Mar. 20, 1961, Ser. No. 96,772
3 Claims. (Cl. 352—14)

This invention relates to a sound motion picture projector, and more particularly to such a projector having synchronized drive of its intermittent and continuous film-feeding mechanisms.

An object of the invention is to provide new and improved synchronized continuous and intermittent film-feeding mechanisms in a sound motion picture projector.

Another object of the invention is to provide a sound motion picture projector in which an intermittent film feed and a continuous film feed are synchronized by a feeler engaging a side of a loop of film between the intermittent film feed and the continuous film feed.

A complete understanding of the invention may be obtained from the following detailed description of a sound motion picture projector forming a specific embodiment thereof, when read in conjunction with the appended drawings, in which.

The invention provides a sound motion picture projector in which a film is advanced intermittently past an aperture plate by an intermittent feed and is advanced continuously past a sound head by a continuous feed with a free loop between the plate and the head. One of the two feeds is driven by fixed speed drive means and the other feed is driven by an adjustable drive so regulated by a feeler biased against one side of the loop as to make the speeds of the two feeds identical.

Figure 1:
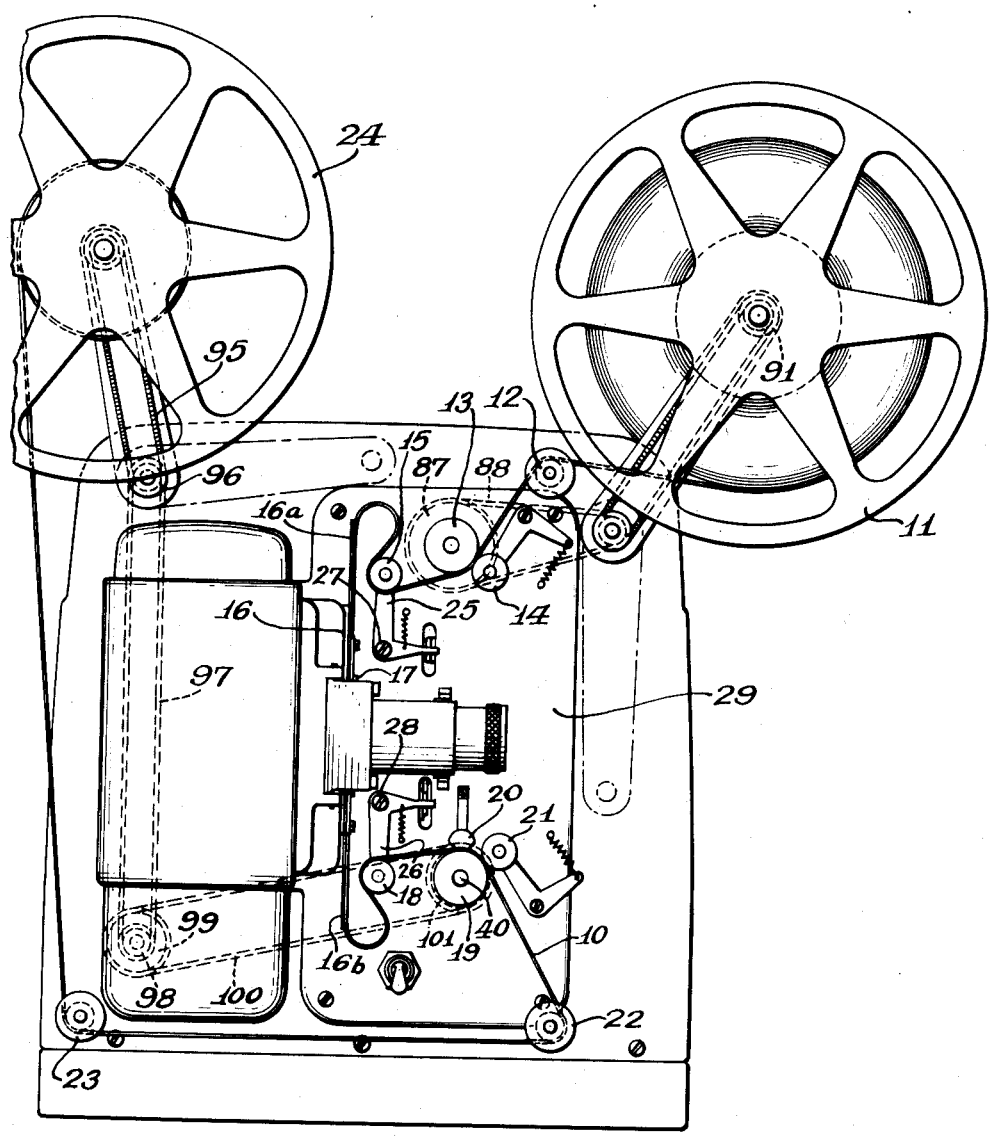
FIG. 1 is a fragmentary, side elevation view of a sound motion picture projector forming one embodiment of the invention.
Figure 2:
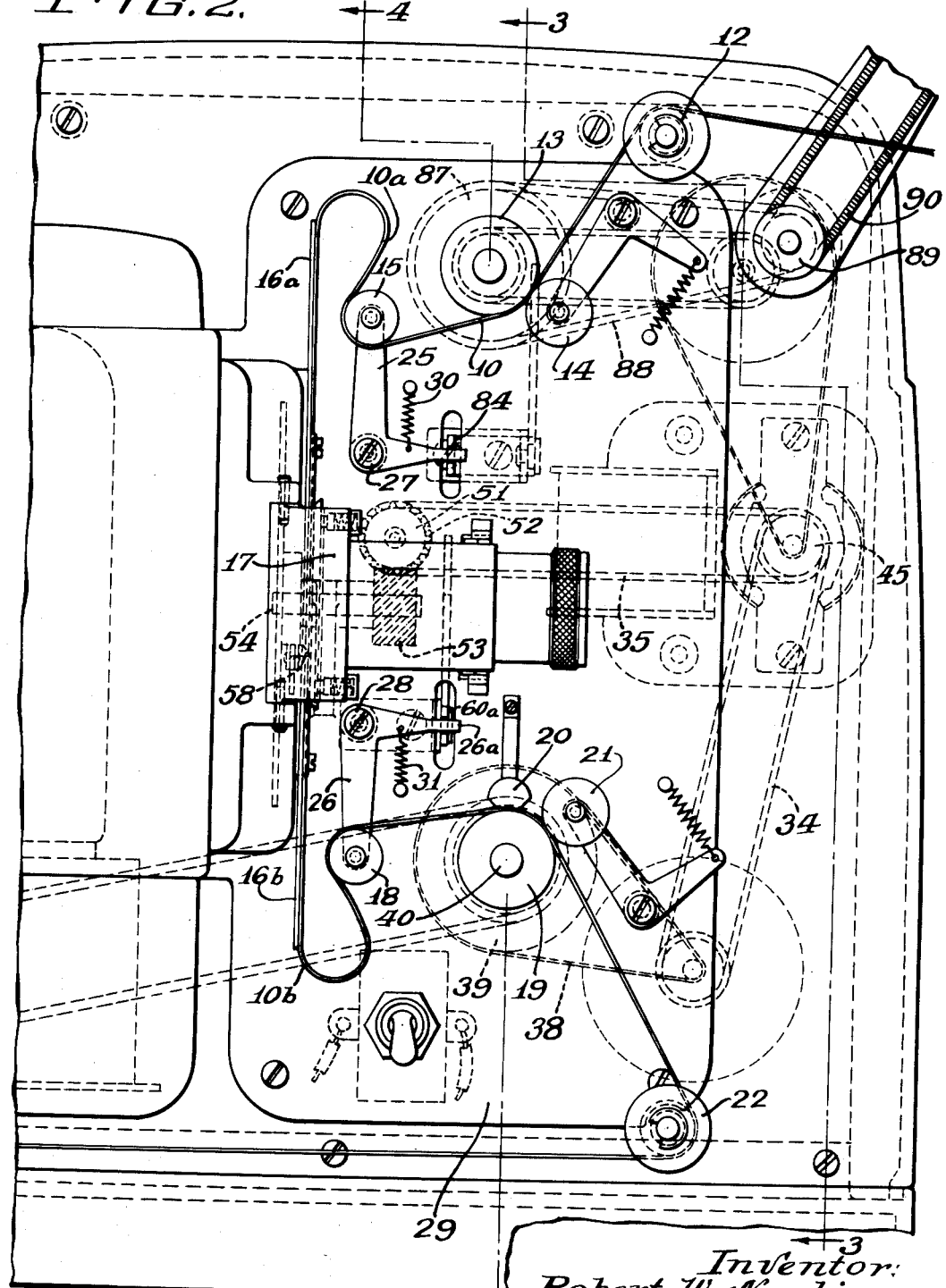
FIG. 2 is an enlarged fragmentary, side elevation view of the projector of FIG. 1.
Figure 3:
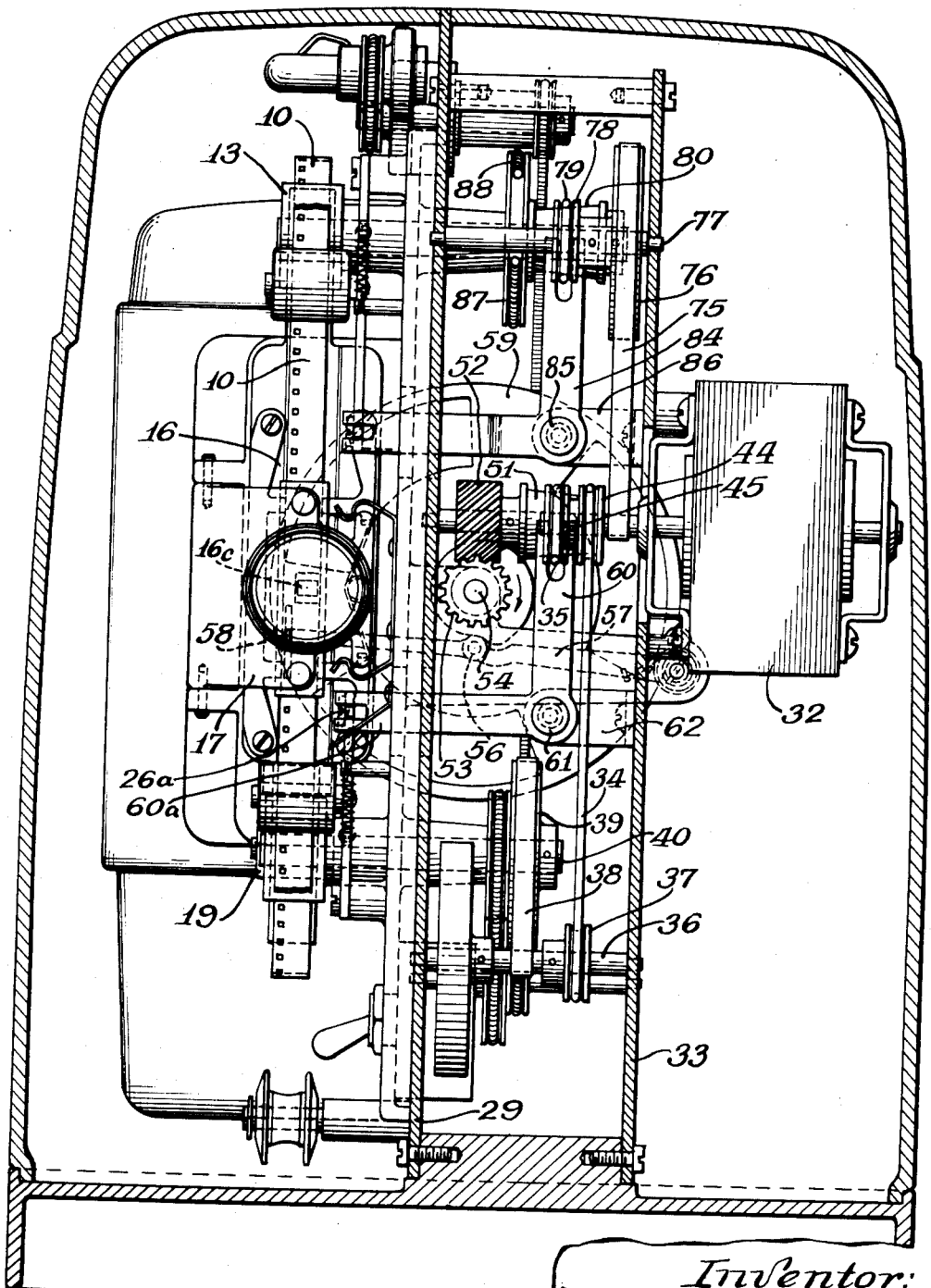
FIG. 3 is an enlarged vertical sectional view taken along line 3—3 of FIG. 2.
Figure 4:
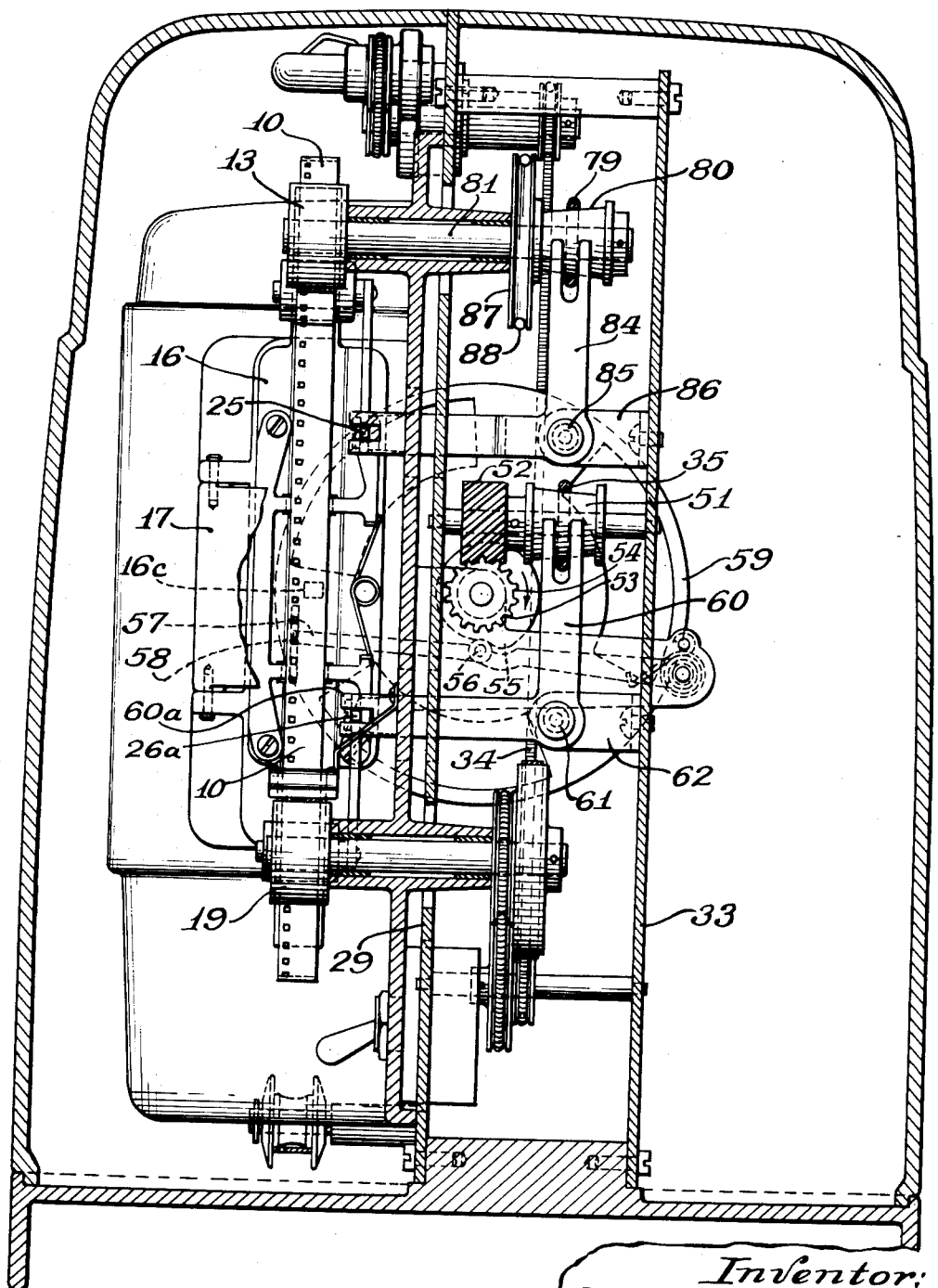
FIG. 4 is an enlarged vertical sectional view taken along line 4—4 of FIG. 2.

Referring now in detail to the drawings, there is shown therein a sound motion picture projector in which a known film 10 (FIG. 1) having an optical portion and a sound track is supplied from a supply reel 11 to a path defined by a guide roller 12, capstan 13 and presser roller 14, feeler roller 15, aperture plate 16 and gate 17, feeler roller 18, sound drum 19, sound head 20, presser roller 21, guide rollers 22 and 23 and takeup reel 24. The rollers 15 and 18 are mounted on levers 25 and 26 pivotally mounted on pins 27 and 28 projecting from mechanism plate 29, and are biased by springs 30 and 31 against exterior sides of free loops 10a and 10b, the other sides being supported by abutments 16a and 16b forming extensions of the aperture plate 16. The driving arrangement of the projector is best seen in FIGS. 2, 3 and 4 and includes an electric motor 32 mounted on mechanism plate 33 and driving belts 34 and 35 through pulleys 44 and 45. The belt 34 drives shaft 36 through pulley 37, and the shaft 36 drives the sound drum 19 continuously at a fixed rate of speed by means of belt 38, pulley 39 and shaft 40 keyed to pulley 39 and the sound drum.

The belt 35 drives the intermittent feed of the projector at a variable rate of speed through tapered sheave or pulley 51, gears 52 and 53, shaft 54 to which the gear 53 is keyed, cam 55 keyed to the shaft 54, and cam follower 56 on known shuttle arm 57 having a shuttle or ratchet-type pawl 58. A known shutter 59 is keyed to the shaft 57. The speed of the film feed by the shuttle 58 and the speed of the shutter 59 may be varied by shifting the belt 35 along the tapered sheave 51 by means of a forked belt-shifting lever 60 pivotal on pin 61 fixed to bracket 62 fastened to the mechanism plate 33. The lever 60 has a forked arm 60a connected with a predetermined amount of lost motion to a finger 26a of feeler lever 26. If the speed at which the film 10 is advanced past aperture 16c is slower than that at which the film is taken from the loop 10b by the sound drum 19, the bight of the loop 10b is raised and, due to the increased stiffness of the portion of the loop engaged by the feeler roller 18, the feeler arm 26 is swung in a counter-clockwise direction, as viewed in FIG. 2. This swings the lever 60 clockwise, as viewed in FIGS. 3 and 4, to move the elastic belt 35 to a smaller diameter portion of the sheave 51 thereby increasing the film feed speed by the shuttle 58. Conversely, if the feed of the film into the loop 10b by the shuttle 58 is faster than the rate of advancement from the loop 10b by the sound drum 19, the bight of the loop 10b lowers to permit the feeler arm 26 to swing clockwise, as viewed in FIG. 2. This swings the lever 60 counter-clockwise, as viewed in FIGS. 3 and 4, to shift the belt 35 to a larger diameter portion of the tapered sheave 51 to slow the drive of the shuttle 58 to the same speed as that of the sound drum 19.

The motor 32 also drives the capstan 13 at a variable rate of speed by means of belt 75, pulley 76 keyed to shaft 77, pulley 78, elastic belt 79, and tapered sheave 80 keyed to shaft 81 to which the capstan 13 is keyed. The speed at which the film 10 is fed into the free upper loop 10a by the capstan 13 is regulated by the feeler roller 15 and lever 25 to synchronize the capstan speed with the speed at which the film is withdrawn from the loop 10a by the pawl 58. If the speed of the capstan 13 is too fast, the bight of the loop 10a raises and the lever 25 swings counter-clockwise, as viewed in FIG. 2, and swings forked lever 84 clockwise, as viewed in FIGS. 3 and 4. The lever 84 is mounted on pin 85 carried by bracket 86, and moves the belt 79 to a larger diameter portion of the tapered sheave 80 to slow the rotation of the capstan 13. Conversely, if the speed of the capstan 13 is too slow, the bight of loop 10a is lowered. This turns lever 25 clockwise, as viewed in FIG. 2, to swing lever 84 counter-clockwise, as viewed in FIGS. 3 and 4, to move belt 79 to a smaller diameter portion of the tapered sheave 80 to increase the speed of the capstan 13.

For rewinding the film 10 onto the supply reel 11, the film is passed directly from the reel 24 to the reel 11 bypassing the capstan 13, the gate 17, sound drum 19 and rollers 22 and 23, pulley 87, belt 88, pulley 89, removable belt 90 and known pulley and one-way clutch mechanism 91 being used to drive the reel 11 in the desired direction. To drive the takeup reel 24 in the desired direction during forward operation of the projector, a removable belt 95 (FIG. 1) is driven by sheave 96, belt 97, sheaves 98 and 99, belt 100 and sheave 101 keyed to shaft 40.

While the invention is thus described, it is not wished to be limited to the precise details described, as changes may be readily made without departing from the spirit of the invention as defined in the claims.

What is claimed is:

1. In a sound motion picture projector, an aperture plate, shuttle means for intermittently advancing a film along the aperture plate, a sound head, continuous advancing means for advancing the film continuously past the sound head, the portion of film positioned between said aperture plate and continuous advancing means being formed into a free loop, feeler means biased against an exterior side of the loop, drive means adjustable by the feeler means to drive the shuttle means and the continuous advancing means in synchronism, capstan means for feeding film into a second free loop to the aperture plate, second feeler means biased against an exterior side of the second free loop, and drive means adjustable by the second feeler means to drive the capstan means in synchronism with the shuttle means.

2. In a sound motion picture projector, a mechanism plate, an aperture plate at one side of the mechanism plate, a shuttle for advancing a film intermittently along the aperture plate, a sound drum for advancing the film continuously from the aperture plate, a portion of the film between the aperture plate and the sound drum being in the form of a free loop, a feeler member mounted pivotally on the mechanism plate and biased against one side of the free loop, first drive means for driving the shuttle intermittently, second drive means for driving the sound drum continuously, speed regulating means responsive to the feeler member for adjusting the first drive means to synchronize the first and second drive means, a capstan for advancing the film toward the aperture plate, guide means forming the portion of the film between the capstan and the aperture plate into a second free loop, second feeler means biased against one side of the second free loop, and third drive means controlled by the second feeler means to adjust the speed of the capstan.

3. The apparatus of claim 2 wherein the third drive means includes a tapered drive sheave and a belt shiftable along the sheave, and the second feeler means includes belt-shifting means operably connected to the feeler member.

References Cited by the Examiner

UNITED STATES PATENTS

| 1,258,352 | 3/18 | Mehlfelder | 226—76 |
| 1,827,588 | 10/31 | Kellogg. | |
| 1,958,152 | 5/34 | Oehmichen | 226—44 |
| 2,095,831 | 10/37 | Philips | 352—15 |

FOREIGN PATENTS 772,706   4/57   Great Britain.

NORTON ANSHER, *Primary Examiner.*

EMIL G. ANDERSON, G. Y. CUSTER, *Examiners.*